(12) United States Patent
Kalish

(10) Patent No.: US 7,995,506 B2
(45) Date of Patent: Aug. 9, 2011

(54) SYSTEM AND METHOD FOR INTEGRATING INFORMATION SERVICES THROUGH CELLULAR NETWORK

(75) Inventor: Danny Kalish, Rannana (IL)

(73) Assignee: Flash Networks Ltd., Herzeliya (IL)

( * ) Notice: Subject to any disclaimer, the term of this patent is extended or adjusted under 35 U.S.C. 154(b) by 589 days.

(21) Appl. No.: 11/086,631

(22) Filed: Mar. 22, 2005

(65) Prior Publication Data

US 2005/0213592 A1  Sep. 29, 2005

Related U.S. Application Data

(60) Provisional application No. 60/555,314, filed on Mar. 23, 2004.

(51) Int. Cl.
*H04B 7/00* (2006.01)
(52) U.S. Cl. .................. 370/310; 455/414.1; 455/414.2; 455/456.1; 455/406; 455/404.2; 709/224; 709/225; 709/229
(58) Field of Classification Search .................. 340/7.48; 455/456.1, 414.1–414.2, 435.1, 406, 404.2, 455/414.3, 414.4; 709/217–219, 201–203, 224, 225, 229; 370/310; 726/12
See application file for complete search history.

(56) References Cited

U.S. PATENT DOCUMENTS

| | | | | |
|---|---|---|---|---|
| 6,731,612 B1 * | 5/2004 | Koss | .............................. | 370/310 |
| 6,925,595 B1 * | 8/2005 | Whitledge et al. | ............ | 715/234 |
| 6,959,318 B1 * | 10/2005 | Tso | ................................ | 709/203 |
| 2003/0157942 A1 * | 8/2003 | Osmo | ........................... | 455/456 |
| 2004/0044622 A1 * | 3/2004 | Blott et al. | ....................... | 705/40 |

* cited by examiner

*Primary Examiner* — Wayne Cai
(74) *Attorney, Agent, or Firm* — Martin Fleit; Paul D. Bianco; Fleit Gibbons Gutman Bongini & Bianco PL

(57) ABSTRACT

The present invention provides a method and a system for handling content requests initiated by mobile wireless devices or content providers servers, implemented within a proxy server. Said method and system comprise of the steps: analyzing request type according to predefined business logic rules; identifying the relevant backend information server resources required for executing said request; connecting to the respective information servers; requesting and receiving the relevant information form the respective information servers; and forwarding the received information to content provider server.

15 Claims, 6 Drawing Sheets

Fig. 1 – System architecture

SYSTEM AND METHOD FOR INTEGRATING INFORMATION SERVICES THROUGH CELLULAR NETWORK

CROSS REFERENCE TO RELATED APPLICATION

This application claims priority from provisional application 60/555,314 filed on Mar. 23, 2004.

BACKGROUND OF THE INVENTION

The present invention relates to wireless network service mediation services. More specifically, the invention relates to a system and method for providing efficient integrated content/information services through cellular networks.

It is becoming increasingly common for content to be provided to mobile terminals operating in mobile (wireless) communication systems, for the purpose of providing mobile terminal users with up-to-date personalized information. Network operators are currently providing information services relating to stock prices, sports, news updates, vending, chat forums, and the like. Initially, network operators provided such information services by using specific messaging services such as the Short Message Service (SMS). Nowadays, mobile communication systems have extended to support mobile access to the Internet and carrier-specific online content.

Various communication protocols, including the Wireless Application Protocol (WAP), i-mode, WAP 2.0 (XHTML MP over W-HTTP), etc. have been developed to provide mobile access to the Internet. When utilizing mobile protocols for communication, a mobile terminal frequently communicates with a gateway or proxy by means of a wireless protocol, and the gateway communicates with content servers via HTTP-TCP/IP to obtain content in the form of Mark-up Languages suitable for mobile devices (WML, XHTML-MP, c-HTML, etc.).

Many implementations of content information services require the content providers to utilize backend information services of the wireless network operator. The operator's backend information systems provide vital information such as user physical location, billing, user preferences and user profile, etc. Hence, the content providers are required to establish interfaces with these backend information services and request the desired information or use the utilities offered. This process of integrating content providers with backend systems in order to provide enhanced services to mobile content users is inefficient, as each content provider must implement specific communication interfaces with each backend system. In this client-server communication, the content provider is the client-side and not the server-side of the interface as it provides the content to the user, thus communication is performed via a separate channel than the regular content stream. This scheme has shortcomings: While the content provider has infrastructure and know-how for providing content (content expertise, a Web or Application server, Web programmers etc.) many times he lacks the infrastructure and resources for implementing a robust client-side interface which requires substantially different know-how. Also, the use of such interfaces causes security and privacy problems, as each content provider gains access to carrier's backend system and is able to retrieve personal user information and to access the backend-systems' network. Coping with these problems naturally complicates the interfaces to be implemented by the content providers, as they must include authentication, authorization, and many times encryption.

Recently, methods and systems have been devised and standardized for alleviating such problems. Systems such as OSA and Parlay simplify the backend interface by standardizing it. However the complexity of implementing the interface is still under the responsibility of the content provider. These recent developments contribute to the present invention in that they potentially simplify the implementation of systems utilizing it.

Mobile proxy servers are traditionally used for intermediating between mobile devices and Internet or Intranet network service applications and for securing the communication thereof. In more advanced systems, the proxy servers are used for improving the navigation and content delivery from the network application.

It is thus the prime objective of the invention to provide a method and system for improving and providing a more efficient procedure for content providers' applications utilizing operators' backend systems.

SUMMARY OF THE INVENTION

A method for handling content requests initiated by mobile wireless devices for which information is required from backend systems for servicing said requests, implemented within a proxy or a gateway server. Said method comprising of analyzing request type according to predefined business logic rules based on various request parameters, Identifying the relevant information server resources required for fulfilling said request, Interfacing with the respective information sources servers and requesting the relevant information, receiving the relevant information form the respective information sources' servers, and forwarding the received information to content provider server.

The said requests are initiated by the mobile device, the information server sources are backend services, such as the user profile, the location or billing, associated with the mobile network operator and the received backend information is embedded within user request and transferred to the content provider service. Requested parameters may include requested content, user identification, requesting device and source network.

A method and system for handling content requests initiated by mobile wireless devices, for which information is required from backend systems for providing backend services, such as the user profile, the location or billing, said requests, implemented within a proxy or a gateway server. Said method and system are comprised of issuing content request to content server; identifying within content server response a request for backend services; identifying the relevant information server resources required for fulfilling said request; verifying the authorization of said content server to request and receive said information; interfacing with the respective information sources servers and requesting the relevant information; receiving the relevant information form the respective information sources' servers; and forwarding the received information to content provider server.

The requests may be initiated by the mobile device, the information server sources are backend services associated with the mobile network operator and the received backend information is embedded within user request and re-issued to the content provider service, verifying the authorization is obtained from pre-configured authorization lists, obtained from an external system interface, or obtained by interacting with the user for requesting authorization to disclose said requested information.

The method and system described above, wherein the requests are information queries initiated by the content server, the information server sources are backend services, further comprising the steps of: receiving in advance the content in formation from the content server, using the query result for determining whether to forward the information as received from the content server to mobile device.

BRIEF DESCRIPTION OF THE DRAWINGS

These and further features and advantages of the invention will become more clearly understood in light of the ensuing description of a few preferred embodiments thereof, given by way of example only, with reference to the accompanying drawings, wherein—

DETAILED DESCRIPTION OF THE PREFERRED EMBODIMENTS

Figure 1:
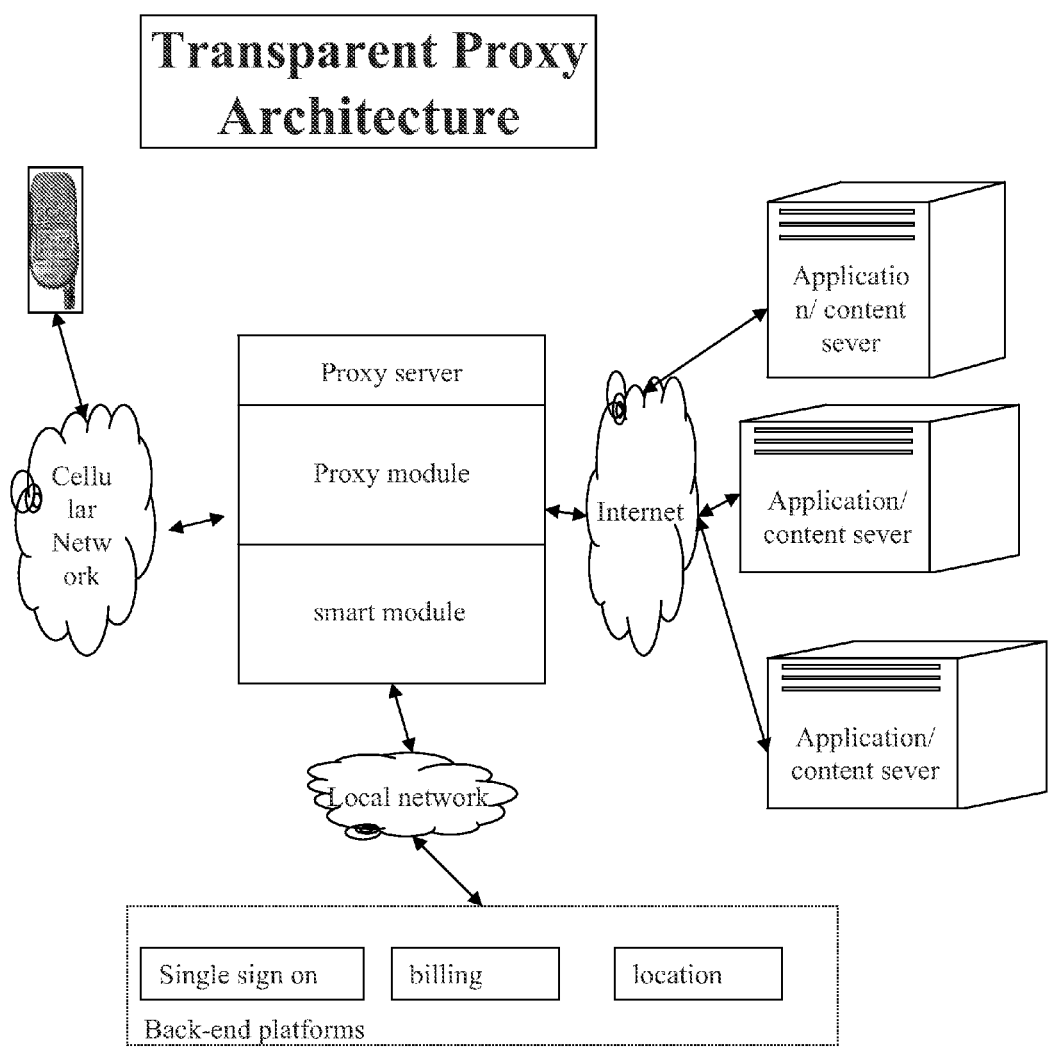
FIG. 1. is a general diagrammatic representation of the environment in which the present invention is practiced.

FIG. 1 illustrates one possible network configuration, in which the present invention can be implemented.

Referring to FIG. 1 of the drawings, it will be seen that a mobile telephone device (A) is connected through a cellular network (B) to the designated server (C) (hereinafter called "the smart proxy server"). The smart proxy server functions as an intermediary gateway between the user mobile device and the Internet content providers (D) (hereinafter called "content servers"), which contain data available for user access. The smart proxy server is designed to establish connection with backend information services, such as location based information, billing systems etc.

The enhanced proxy servers enable different utilities, which offer efficient content services and other advanced services to the mobile users.

The preferred utility as suggested by the present invention refers to improved communication procedure between the mobile users' devices, content information services and the backend information services.

Figure 2:
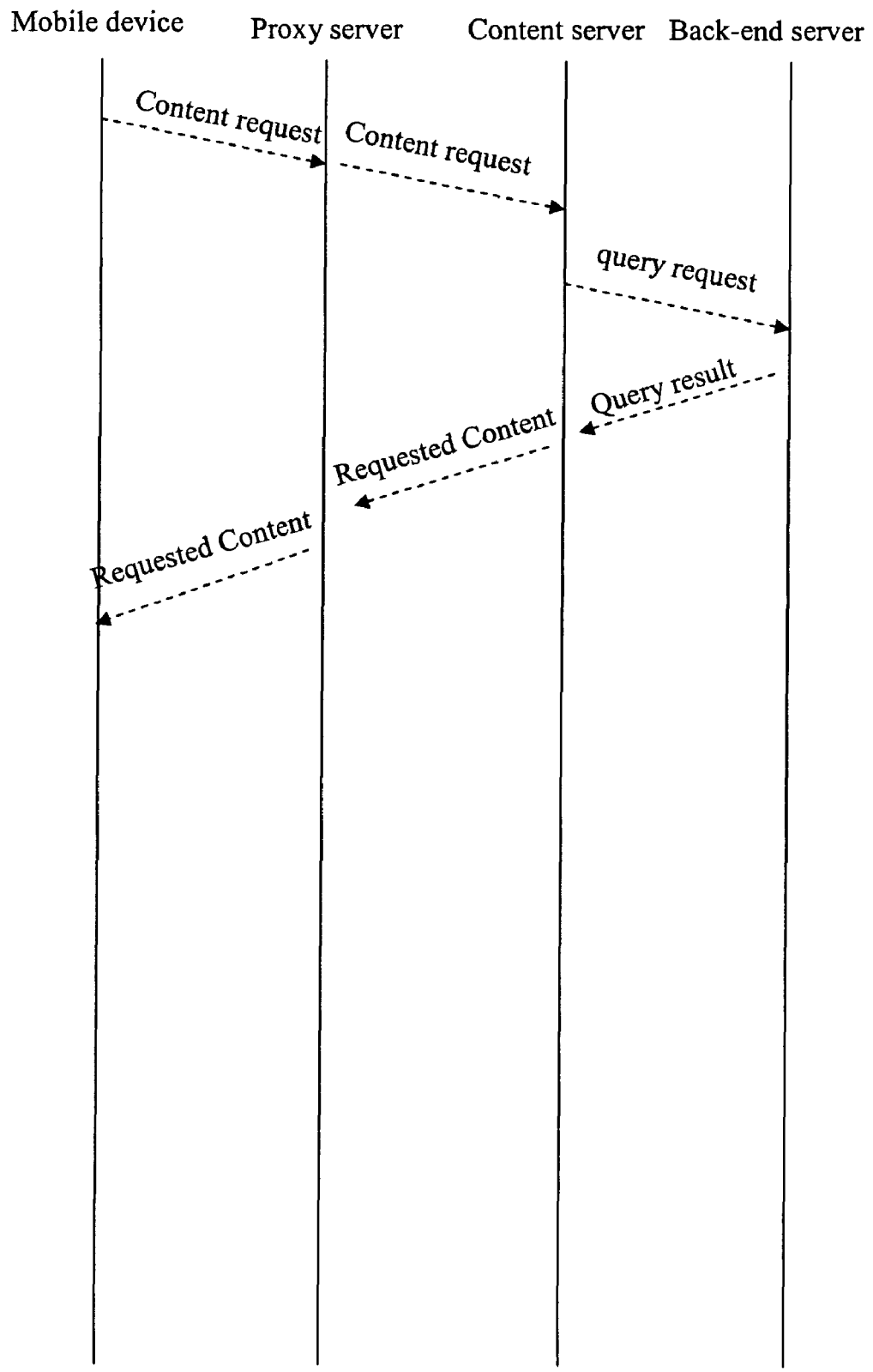
FIG. 2. is a flow chart representing content requests handling according to prior art.

The information flow of handling user request according to prior art is illustrated in FIG. 2. Basically, the user requests are transferred directly to the content provider servers (through the proxy server). If the request requires information that is not provided by the designated provider's server (e.g. location of mobile phone), the information needs to be retrieved from an external information service (backend platforms). Hence each content provider needs to establish connection with the respective backend platforms information services.

Figure 3:
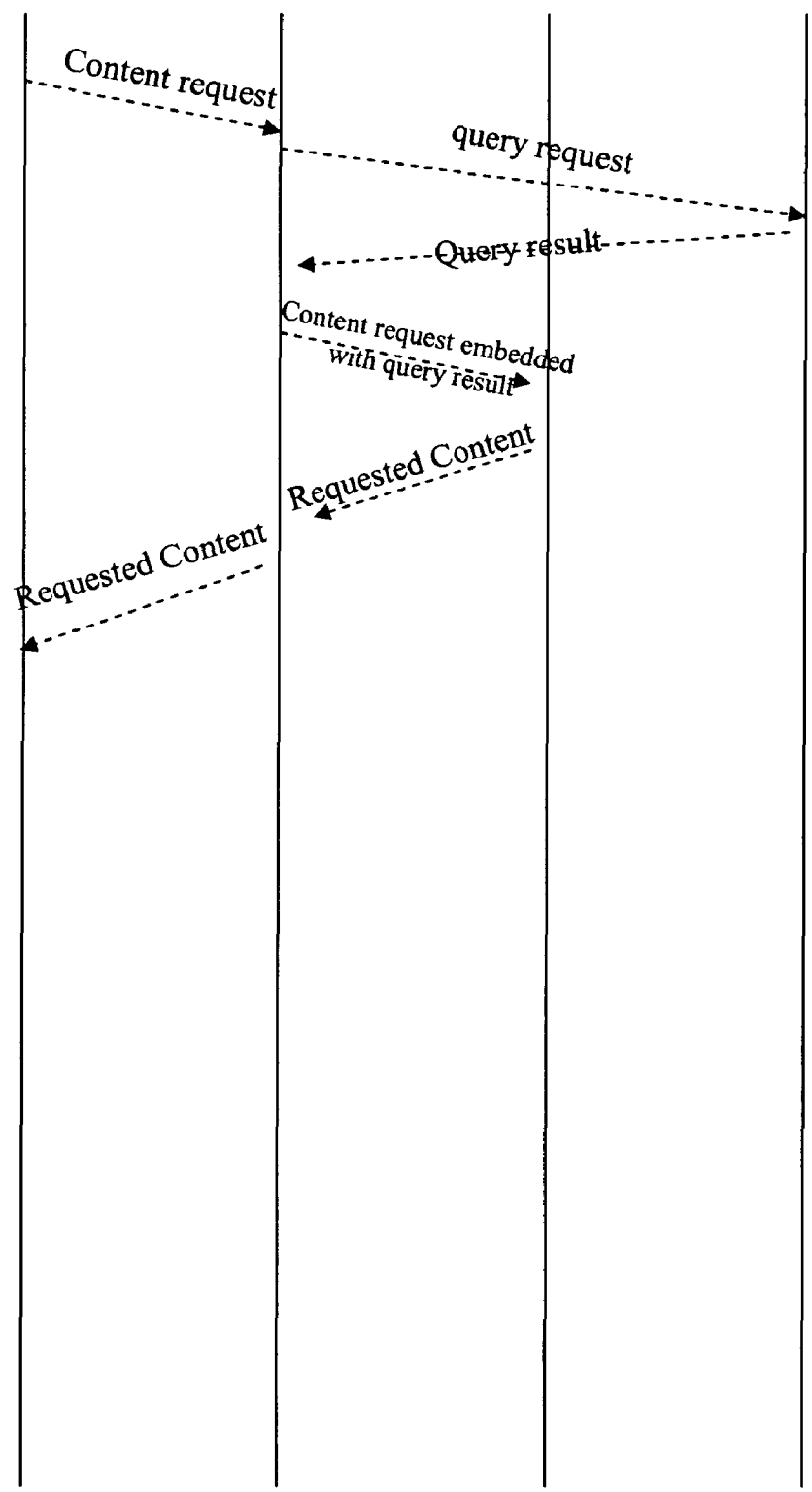
FIG. 3. is an information flow representing a first option of handling content requests according to the present invention.
Figure 4:
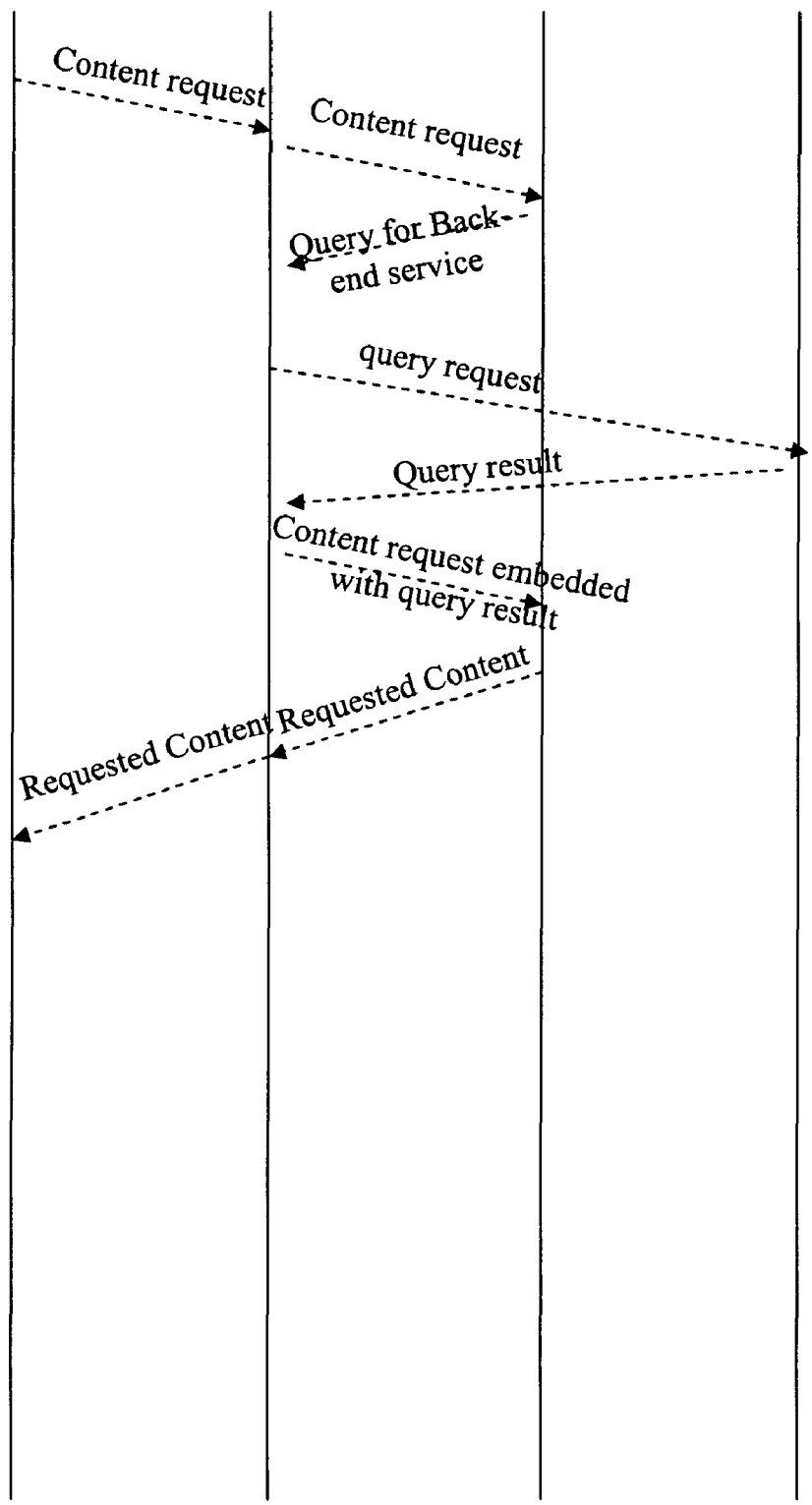
FIG. 4. is an information flow representing a second option of handling content requests according to the present invention.

FIG. 2 and FIG. 3 illustrate two alternative information flows as suggested by the present invention. The smart proxy server, according to the invention's new approach, acts as information mediator between the content server and the backend services. According to a first option scenario, as seen in FIG. 3, the smart proxy server uses internal configured or programmed logic to identify the required backend information service before the request is transferred to the content server. The proxy then communicates with the backend service for retrieving the required information and then issues the request to the content server with the required information embedded within the request. According to a second optional scenario, as seen in FIG. 4, the proxy server provides the backend service information in response to a content server query: The proxy issues a request to the content server as received from the device, without the required backend-systems information. The content site returns a response within the normal content stream, aimed at the proxy, requesting additional backend information or service. The proxy performs the requested backend information query, receives the response data, and re-issues the request to the content site, now with the response data embedded.

Figure 5:
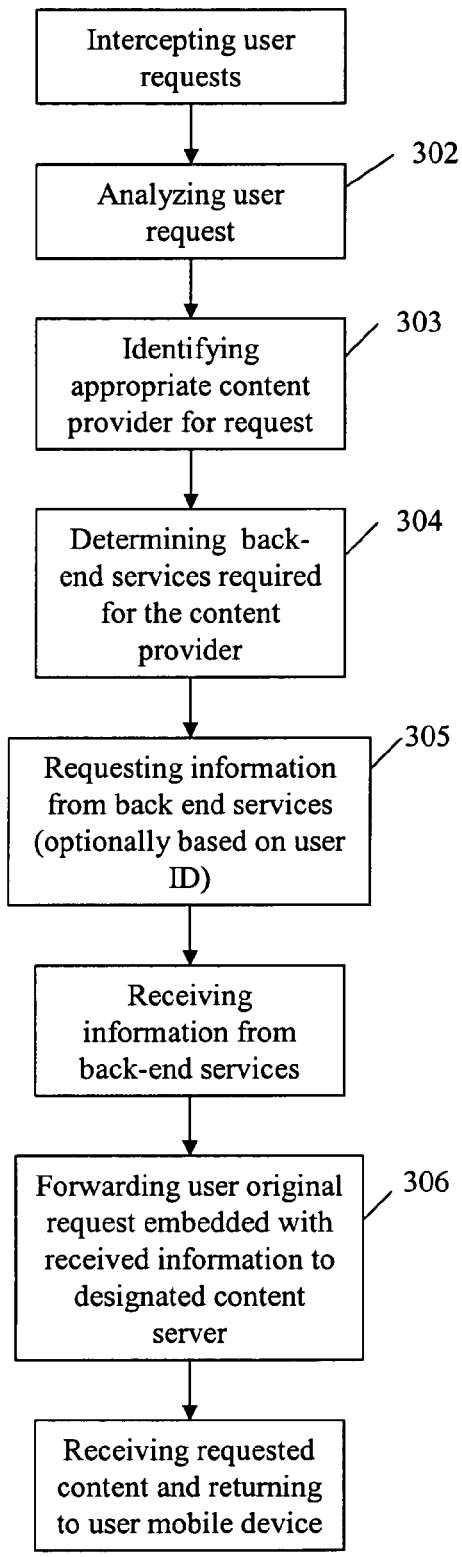
FIG. 5. is a flow-chart representing the process of integrating information from backend information services and content application according to the present invention.

FIG. 5 is a flowchart illustrating the new process of handling user requests for content services as a possible embodiment of the present invention. Each request intercepted by the proxy server is analyzed (302) according to business logic rules for identifying its type (e.g. location-based information) and the content source server is detected (303) (The request type can be encoded in the request header). The required backend information service is determined (304) according to requested service identification, message type, user details, etc. Then, the proxy server establishes a connection with the respective back end information service and requests the desired information (305) (e.g. user location). Once the information is provided by the backend service the proxy server sends the user's original request embedded with the additional information provided by the backend service to the appropriate content provider (306). For example, if a user has requested information about nearby restaurants, the proxy server identifies the message as a location-based query, connects to backend server in order to retrieve the user location, and forwards the user request with the user location data to the respective content application. In return the content server retrieves the relevant restaurant information according to the user location. The proxy server then forwards this response to the user mobile device.

Not all backend servers, which are required by content providers, may be identified prior to the receipt of users request by content provider's site as described above. For example, billing information such as user credit may be requested by the content provider server only after the server analyzes user request; following which, the content provider server is required to send a request to the backend billing service to check user credit. The content server, according to the present invention, can encode its request for backend information in a response to the user agent. This response is intercepted by the proxy server that can perform the information query on behalf of the content server and forward the query result to the content server as a renewed request with embedded backend information. Such procedures enable more efficient processing of the content server query, which does not necessitate establishing a direct connection with the backend services as is customary in prior art. Furthermore, the content server always assumes the role of server in the communication scheme, thus not necessitating it to utilize both client-side and server-side interfaces that greatly complicate the service.

Figure 6:
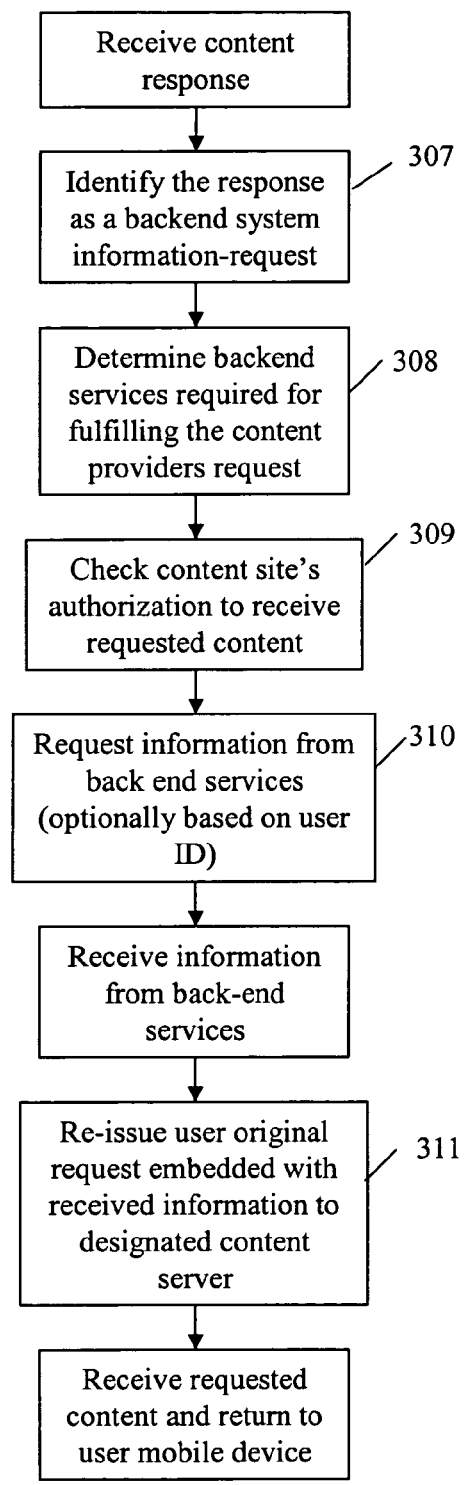
FIG. 6. is a flowchart illustrating the new process of handling a content site response which requests the proxy for additional backend systems information, as a possible embodiment of the present invention.

FIG. 6 is a flowchart illustrating the new process of handling a content site response which requests the proxy for additional backend systems information, as a possible embodiment of the present invention. Each content site's response received by the proxy server is analyzed (307) for identifying it as a backend systems interface request. The response is then analyzed to discern the required backend information services for fulfilling it (308). In this case the content site is initiating the request for information; hence the proxy server must verify the site's authorization to receive the requested information (309). This authorization may either be configured in the proxy or an external carrier's system; or the user may be interrogated whether he/she are willing to disclose their location to the said site. Upon authorization, the proxy server establishes a connection with the respective back end information service and requests the desired information (310) (e.g. user location). Once the information is provided by the backend service the proxy server re-issues the original request, or the like, embedded with the additional information provided by the backend service to the appropriate content provider (311). For example, if a user has requested information about nearby restaurants, the content server application identifies that it requires user location to service this request. It issues a response encoded for the proxy server with the required query. The proxy server identifies the response as a location-based query (instead of a user-agent content response). The proxy verifies the sites authorization to receive user location, and connects to backend server in order to retrieve the user location, and re-issues the user request with the user location data to the content server. In return the content server retrieves the relevant restaurant information according to the user location. The proxy server then forwards this response to the user mobile device.

Another feature of the smart proxy server provides a more efficient procedure of communicating with the content provider server. For example, when the credit query result affects the content server decision whether or not to provide the user with the requested information, the smart proxy server can receive the requested information from the content server in advance and transmit it to the user only if the credit query result is positive.

While the above description contains many specificities, these should not be construed as limitations on the scope of the invention, but rather as exemplifications of the preferred embodiments. Those skilled in the art will envision other possible variations that are within its scope. Accordingly, the scope of the invention should be determined not by the embodiments illustrated, but by the appended claims and their legal equivalents.

What is claimed is:

1. A method of handling content requests initiated by mobile wireless devices, over a mobile network having backend services, wherein the content requests are directed at and responded by at least one content server, are handled by a communication server, wherein the content requests require information available from the backend services, the method comprising:
    encoding a request for backend services information by the content server within a response to said content request for which the content server requires backend services information;
    intercepting the response of the content server and decoding the encoded request for backend services information, wherein said intercepting and decoding is executed by the communication server;
    executing an information query over the backend services on behalf of the content server based on the encoded request, wherein said execution is carried out by said communication server;
    issuing the query result to the content server in a form of a renewed content request exhibiting the requested backend services information encoded in request parameters or headers.

2. The method of claim 1 further comprising: verifying authorization of the content server to request and receive the backend services information.

3. The method of claim 2, wherein the verifying of the authorization is obtained from pre-configured authorization lists.

4. The method of claim 2, wherein the verifying of the authorization is obtained from an external system interface.

5. The method of claim 2, wherein the verifying of the authorization is obtained by interacting with the user for requesting authorization to disclose the required information related to the backend services.

6. The method of claim 1 wherein intercepting the content server response, executing the information query on behalf of the content server and forwarding the query result to the content server in the form of a renewed content request exhibiting the required backend services information are executed by the communication server.

7. The method of claim 1 wherein the backend services provide one of: user profile; location; billing information.

8. The method of claim 1 wherein the required information relating to the backend service is at least one of: requested content, user identification, requesting device, source network.

9. The method of claim 1, further comprising: responsive to information query executed on behalf of the content server, determining whether to forward the information from the content server to the mobile device.

10. The method according to claim 1, wherein the required backend services information in the renewed content request is embedded within the header of the content request.

11. The method according to claim 1, wherein the required backend services information in the renewed content request is embedded within the request parameters of the content request.

12. A system for handling content requests initiated by mobile wireless devices, over a mobile network having backend services, wherein the content requests are directed at and responded by content servers, are handled by a communication server, and
    wherein the content requests require information available from the backend services, the system comprising:
    at least one content server arranged to encode a request for backend services information responsive to a content request for which the content server requires backend services information; and
    the communication server arranged to:
    intercept the response of the content server and decoding the encoded request for backend services information;
    execute an information query over the backend services on behalf of the content server based on the encoded request;
    issue the query result to the content server in a form of a renewed content request exhibiting the requested backend services information encoded in request parameters or headers.

13. The communication server of claim 12, wherein the backend service is at least one of: user profile, location, billing.

14. The system of claim 12, wherein the communication server further comprises processing means arranged to check the required information from the backend system services for determining whether to forward the information as received from the content server to the mobile device.

15. A method of handling content requests initiated by mobile wireless devices, over a mobile network having backend services, wherein the content requests are directed at and responded by at least one content server, are handled by a communication server, wherein the content requests require information available from the backend services, the method comprising:
- receiving an initial content request from the mobile device of a user, wherein said content request is received by the communication server;
- transmitting said received content request to the content server;
- analyzing the content request to define the required backend services information, wherein said backend services enable providing multiple information types including: location information indicating the location of the mobile device from which said content query was sent; billing information indicating an account status related to a user of the mobile device; and profile of the user related to the mobile device;
- encoding a request for backend services information by the content server within a response to said content request for which the content server requires backend services information, according to the defined required information;
- intercepting the response of the content server and decoding the encoded request for backend services information, wherein said intercepting and decoding is executed by the communication server not requiring interrogation with the user mobile device;
- executing an information query over at least one backend service on behalf of the content server based on the encoded request, wherein said execution is carried out by said communication server;
- issuing the query result to the content server in a form of a renewed content request exhibiting the requested backend services information encoded in request parameters or headers,
- retrieving content from the content server, according to the renewed request; and
- transmitting the retrieved content to the mobile device of the user, wherein all communication between the mobile device, communication server, content server and backend service are transmitted by standard data communication protocol.

* * * * *